(12) United States Patent
Yao et al.

(10) Patent No.: US 12,343,817 B2
(45) Date of Patent: Jul. 1, 2025

(54) ADSORBABLE ELECTROMAGNETIC FIELD AUXILIARY DEVICE FOR LARGE COMPONENTS

(71) Applicant: ZHEJIANG UNIVERSITY OF TECHNOLOGY, Zhejiang (CN)

(72) Inventors: Jianhua Yao, Zhejiang (CN); Liang Wang, Zhejiang (CN); Kejing Jiang, Zhejiang (CN); Qunli Zhang, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 669 days.

(21) Appl. No.: 17/795,064

(22) PCT Filed: Dec. 18, 2019

(86) PCT No.: PCT/CN2019/126340
§ 371 (c)(1),
(2) Date: Feb. 6, 2023

(87) PCT Pub. No.: WO2021/109256
PCT Pub. Date: Jun. 10, 2021

(65) Prior Publication Data
US 2023/0152354 A1    May 18, 2023

(30) Foreign Application Priority Data
Dec. 3, 2019 (CN) .......................... 201911220813.0

(51) Int. Cl.
*B23K 26/70* (2014.01)

(52) U.S. Cl.
CPC ................. *B23K 26/702* (2015.10)

(58) Field of Classification Search
CPC ............................................ B23K 26/00–707
See application file for complete search history.

(56) References Cited

FOREIGN PATENT DOCUMENTS

| CN | 103753028 A | 4/2014 | |
|---|---|---|---|
| CN | 104043905 A | 9/2014 | |
| CN | 107868958 A | 4/2018 | |
| CN | 207418865 U | 5/2018 | |
| CN | 207563945 U | 7/2018 | |
| DE | 102004039916 A1 * | 3/2006 | ............. B23K 15/08 |
| KR | 101296405 B1 | 3/2013 | |

* cited by examiner

*Primary Examiner* — Judy Nguyen
*Assistant Examiner* — James Split
(74) *Attorney, Agent, or Firm* — MUNCY, GEISSLER, OLDS & LOWE, P.C.

(57) ABSTRACT

Adsorbable electromagnetic field auxiliary device for large components, comprises an iron core being adsorbed on the component to be processed with an integral rectangular frame including a pair of lateral sides and a pair of longitudinal sides; lateral sides are installed with electromagnetic coils having opposite magnetic pole pointing to the component. A photoelectric sensor installed on the longitudinal side senses the real-time position of the laser head; the longitudinal opposite sides are each provided with a screw movement device and a brush device; the brush head of the brush device slides on the surface of the component forming a directional electric field; the motor controlled by the central controller adjusts the position of the brush device, so that the two brush heads and the laser head are always in a straight line to ensure the stability of the electric field in the laser processing area and uniformity.

5 Claims, 3 Drawing Sheets

ADSORBABLE ELECTROMAGNETIC FIELD AUXILIARY DEVICE FOR LARGE COMPONENTS

TECHNICAL FIELD

The invention relates to an electromagnetic field auxiliary device used for laser processing of large components.

BACKGROUND ART

Large components are often bulky and heavy, and once they fail, the loss of benefits is immeasurable. And large parts are not easy to disassemble and move, so they are mostly repaired on site. With the development of laser technology, laser processing has been gradually applied in practical industrial applications. Due to the good processing automation and high processing flexibility, on-site processing of failed parts can be well realized, so laser repair has gradually gained wider practical application. However, traditional laser processing is prone to problems such as pores and cracks, which affect the quality and performance of the laser processing area. At present, in order to solve defects such as pores, external energy fields, such as electromagnetic fields and vibration fields, can be applied. As far as the applied electromagnetic field is concerned, the strength of the electromagnetic field required for laser processing is relatively large, which makes the electromagnetic field equipment cumbersome and uneasy for frequent moving during on-site laser processing. The large size and weight of the electromagnetic field device limits the possibility of its integration in laser processing equipment to follow it.

The patent application number CN201721648238.0 filed by Wang Liang et al. of Zhejiang University of Technology is a wall-climbing laser manufacturing platform that can provide steady-state magnetic field assistance. The invention includes a frame, a laser head, a magnetron tire, etc., but the device only integrates steady-state magnetic field-assisted laser processing, cannot form Lorentz force, and has limited effect of regulating pores. At the same time, the device uses four magnetic wheels to provide a steady-state magnetic field, which has a small contact surface with the part to be processed, and the magnetic field distribution formed between the four magnetic wheels is not a steady-state directional magnetic field, that is, when the laser head moves in the working area during the processing process, the direction of the magnetic field is different, and the regulation of the magnetic field is different, resulting in different laser processing quality.

SUMMARY OF THE INVENTION

Aiming at the problems existing in the above-mentioned on-site laser processing of large components, the present invention provides an electromagnetic field auxiliary device for laser processing of large components.

The invention adopts an integrated iron core which serves as a device structural frame too. The two iron core heads are respectively the N pole and S pole of the magnetic field, so that they are adsorbed on the component to be processed. The two iron core heads adopt large-sized iron core heads to ensure the formation of a stable and uniform magnetic field strength in the same direction in the processing area. The electric field is provided by two brush devices, and the two brushes move with the laser head and are always kept in a straight line to ensure the stability and uniformity of the electric field in the laser processing area. The electric field and magnetic field provided by the device work together to form a directional Lorentz force, which provides an external body force for the laser on-site repair, thereby improving the quality of laser processing.

To overcome the above technical problems, the present invention provides an electromagnetic field auxiliary device for laser processing of large components, which is adsorbed on the component to be processed through an integrated iron core and provides a stable and uniform directional magnetic field. The brush device following the laser head provides a stable directional electric field, and the magnetic field and the electric field are coupled to form a Lorentz force, thereby improving the quality of laser processing.

Adsorbable electromagnetic field auxiliary device for large components, comprises an iron core 3 that can be adsorbed on the component to be processed 1 with an integral rectangular frame including a pair of lateral sides and a pair of longitudinal sides; Each lateral side is installed with an electromagnetic coil 2, and the two electromagnetic coils 2 are connected in series, and the N pole of the magnetic field of one of the two electromagnetic coils 2 point to the component to be processed 1 while the S pole of that of the other of the two electromagnetic coils 2 point to the component to be processed 1;

The laser head 5 moves in the inner space of the iron core 3; a photoelectric sensor 4 is installed on the longitudinal sides of the iron core 3, and the photoelectric sensor 4 senses the real-time longitudinal position of the laser head 5, and the photoelectric The data output end of the photoelectric sensor 4 is connected to a central controller; the photoelectric sensor 4 comprises a photoelectric transmitter 401 and a photoelectric receiver 402 respectively installed on the pair of longitudinal sides;

The longitudinal opposite sides of the iron core 3 are respectively provided with a screw movement device 6, and the two screw movement devices 6 are symmetrically arranged; the screw movement device 6 comprises a motor 601 and a base 602, the screw 603, the slider 604, and the screw 603 is connected to the iron core 3 through the base 602, and the motor 601 drives the screw 603 to rotate to move the slider 604 along the longitudinal sides of the iron core 3 the inner thread of which is engaged on the screw 603; the control end of the motor 601 is connected to the central controller;

A brush device 7 is provided on each of the longitudinally opposite sides of the iron core 3, and the brush head 701 of the brush device 7 slides on the surface of the component to be processed 1 to form a directional electric field; the brush clamp 702 of the device 7 is connected with the slider 604; an elastic copper sheet 703 is installed on the brush clamp 702, and the end of the brush head 701 which is far away from the component to be processed 1 contacts with the elastic copper sheet 703, and the elastic copper sheet 703 keeps the brush head 701 in contact with the component to be processed 1 during the movement;

At least one of the brush clamp 702 and the slider 604 is made of heat-resistant insulating material;

The control end of the motor 601 is connected to the central controller to adjust the position of the brush device 7 so that the two brush heads 701 and the laser head 5 are always kept in a straight line.

Preferably, the bottoms of the laterally opposite sides of the iron core 3 are each provided with an electromagnetic coil 2 the bottom of which is in contact with the component to be processed 1.

Preferably, the brush head 701 is an integrated conductive block, of which the surface contacting with the component to be processed 1 is in the shape of an arc.

Preferably, the brush clamp 702 is provided with counterbores, which is connected with the slider 604 by screws.

Preferably, the to-be-processed surface of the component to be processed 1 is a plane, or a curved surface, or an inclined surface, or a vertical surface, or an elevation working surface.

The iron core 3 adopts an integrated iron core, which not only acts as a conductive magnetic core but also acts as a bearing structure frame of the device;

In the electromagnetic field device, the two electromagnetic coils 2 form a stable directional uniform magnetic field in the area between each other, and the direction of the magnetic field can be changed with the change of the positive and negative electrodes of the current in the electromagnetic coils.

The two brush devices 7 and the laser head 5 are always kept in a straight line, thereby ensuring that the electric field at the laser head 7 is a stable and directional uniform electric field, and the electric field strength is large and the current utilization rate is high. The direction of the electric field can be changed with the change of the positive and negative currents.

The magnetic field and electric field interact to form a stable Lorentz force with controllable direction. In addition, the brush device 7 and the laser head 5 follow up so as to ensure that the direction and magnitude of the Lorentz force in the processing area of the laser head 5 remain stable.

The present invention has the following advantages:

(1) The brush device detects the position of the laser head in real time through the photoelectric sensor, converts the position signal into an electrical signal, and drives the brush device to keep in a straight line with the laser head so as to ensure that the laser processing area is always in a relatively fixed position of the electric field area during the laser processing, so that the electric field distribution direction of the processing area is stable, the isotropy is good, and the electric field size is stable.

(2) The device adopts an integrated iron core, which is used as a conductive core and a structural frame at the same time. The iron core head adopts a large size structure, which can form a large area of directional uniform magnetic field in the area to be processed, improving the stability of the direction and size of the magnetic field, and forming a stable Lorentz force coupled with the electric field, thereby improving the quality of laser processing.

Figure 1:
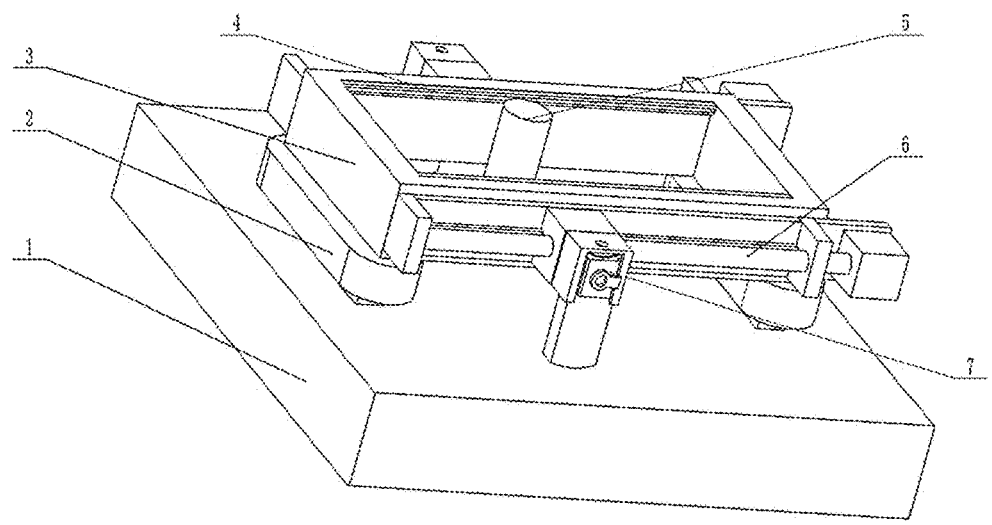
FIG. 1 is a schematic diagram of the overall assembly of the present invention.
Figure 2:
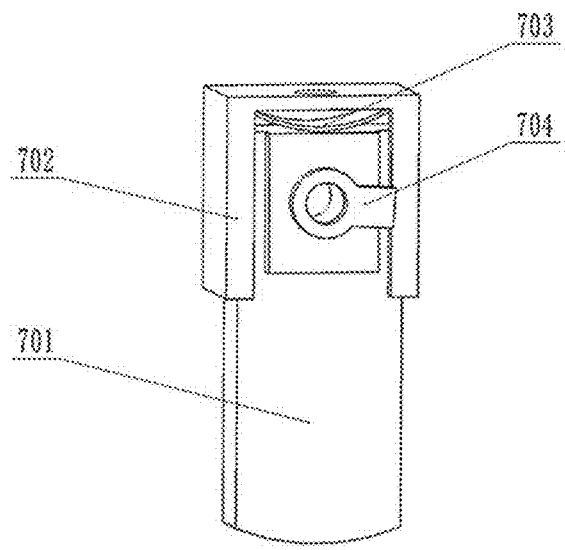
FIG. 2 is a schematic diagram of the structure of the brush device of the present invention.
Figure 3:
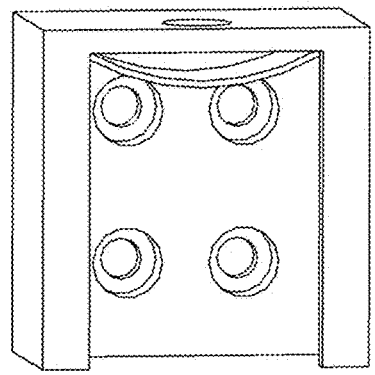
FIG. 3 is a schematic diagram of the structure of the brush clamp of the present invention.
Figure 4:
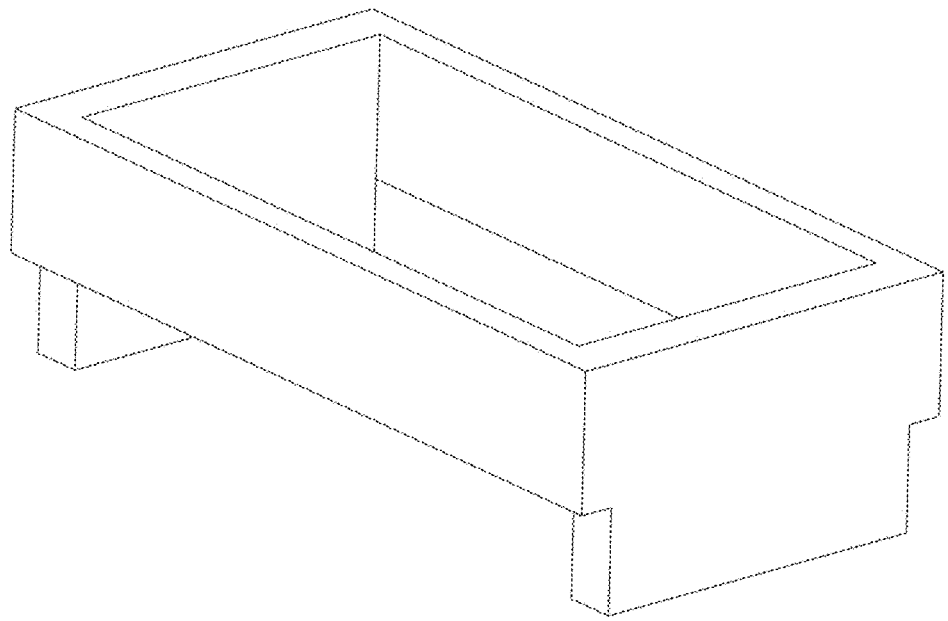
FIG. 4 is a schematic diagram of the structure of the integrated iron core of the present invention.
Figure 5:
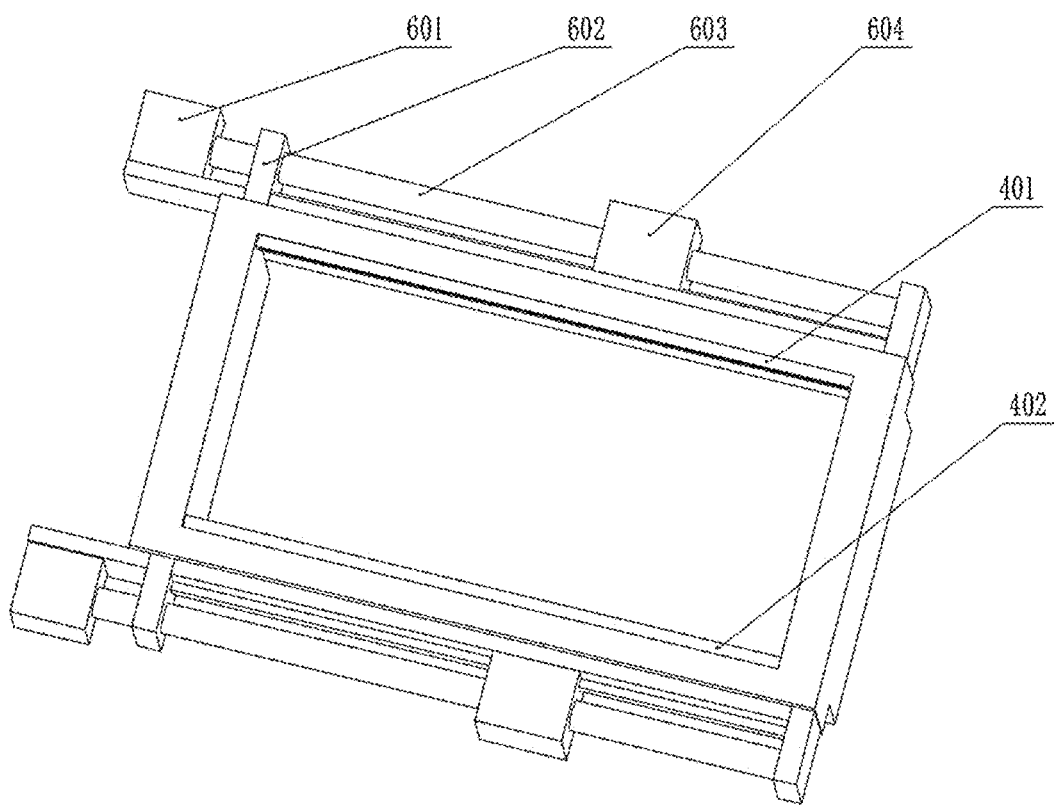
FIG. 5 is a schematic diagram of the screw movement device and the photoelectric sensor of the present invention.
Figure 6:
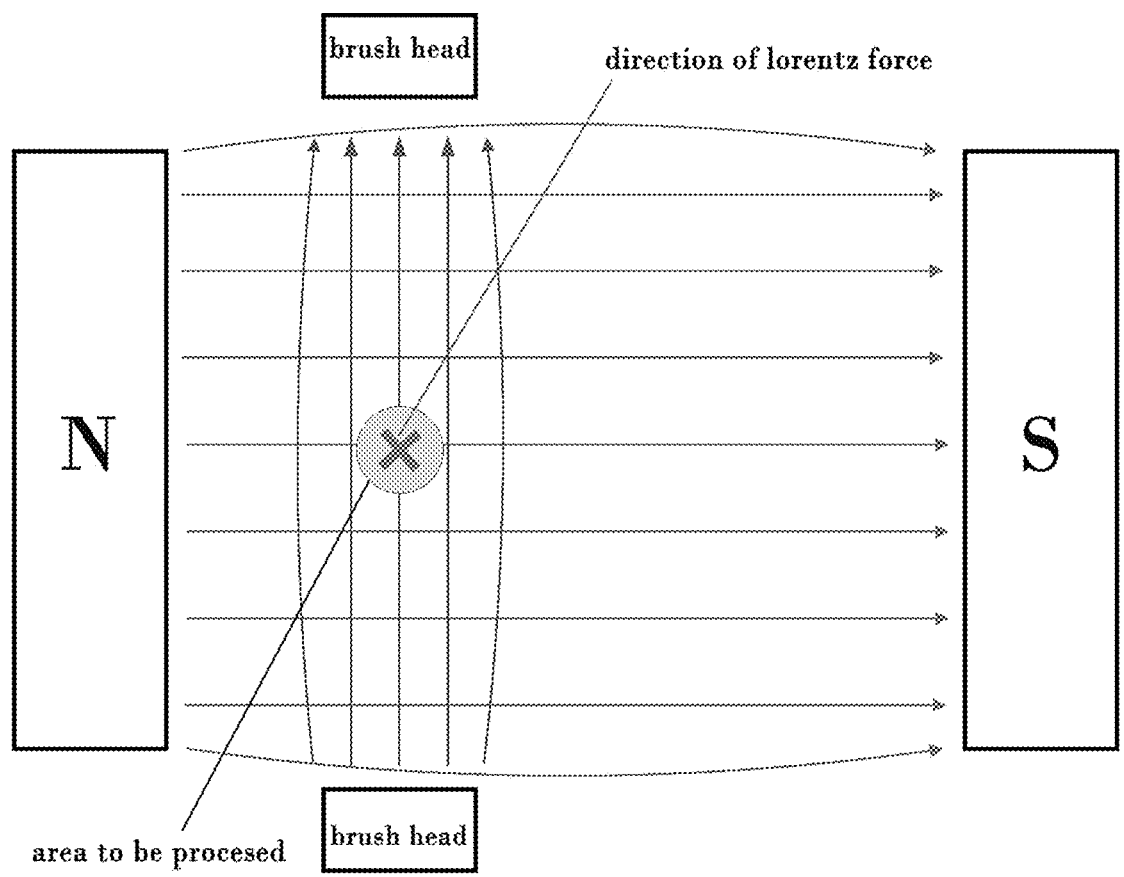
FIG. 6 is a schematic top view of the electromagnetic field distribution of the present invention.

In the above figures: 1—component to be processed; 2—electromagnetic coil; 3—integrated iron core; 4—photoelectric sensor; 401—photoelectric transmitter; 402—photoelectric receiver; 5—laser head; 6—screw movement device; 601—motor; 602—base; 603—screw; 604—slider; 7—brush device; 701—brush head; 702—brush clamp; 703—elastic copper sheet; 704—terminal

EMBODIMENT

The present invention will be further described below in conjunction with the accompanying drawings.

The present invention is an adsorbable electromagnetic field auxiliary device for large components, which is an electromagnetic field device that can be adsorbed on the component to be processed 1, comprise an electromagnetic coil 2, a double-contact integrated iron core 3, a photoelectric sensor 4, a laser head 5, a screw movement device 6 and a brush device 7.

The two ends of the iron core 3 of the electromagnetic field device form the positive and negative poles of the magnetic field and are in contact with the component to be processed 1 to be adsorbed on the component to be processed 1; The electromagnetic field device adopts an integrated iron core, which acts as both the iron core and the structural frame of the device.

The electromagnetic coil 2 is composed of 2 coils connected in series, and the N pole of the magnetic field of one of the two electromagnetic coils 2 points to the component to be processed 1 while the S pole of that of the other of the two electromagnetic coils 2 points to the component to be processed 1;

The photoelectric sensor 4 includes a photoelectric transmitter 401 and a photoelectric receiver 402. The laser head 5 moves in the inner space of the integrated iron core 3, and the real-time position of the laser head 5 parallel to the direction of the screw 603 is sensed by the photoelectric sensor 4 so as to drive the motor 601 to adjust the position of the brush device 7, so that the two brushes and the laser head 5 are always kept in a straight line;

The longitudinal opposite sides of the iron core 3 are respectively provided with a screw movement device 6, and the two screw movement devices 6 are arranged symmetrically. The screw movement device 6 includes a motor 601, a base 602, a screw 603, and a slider 604. The material used for the slider 604 is thermal insulation plastic.

The brush device 7 includes a brush head 701, a brush clamp 702, an elastic copper sheet 703, and a terminal 704. The brush clamp 702 is fastened to the slider 604. The brush head 701 adopts an integrated conductive block, of which the surface contacting with the component to be processed 1 is in shape of an arc. An elastic copper sheet 703 is installed on the brush clamp 702, and the end of the brush head 701 which is far away from the component to be processed 1 is in contact with the elastic copper sheet 703, and the elastic copper sheet 703 keeps the brush head 701 in contact with the component to be processed 1 during the movement. The brush clamp 702 is made of heat-resistant insulating material. The brush clamp 702 is provided with counterbore which is connected with the slider 604 by screws so as to satisfy the tightening requirements and maintain the insulation between the brush head 701 and the screw movement device 6.

In the electromagnetic field device, the two electromagnetic coils 2 form a stable directional uniform magnetic field in the area between each other, and the direction of the magnetic field can be changed with the change of the positive and negative electrodes of the current in the electromagnetic coils.

The two brush devices 7 and the laser head 5 are always kept in a straight line, thereby ensuring that the electric field at the laser head 7 is a stable and directional uniform electric field, and the electric field strength is large and the current utilization rate is high. The direction of the electric field can be changed with the change of the positive and negative electrodes of the currents.

The magnetic field and electric field interact to form a stable Lorentz force with controllable direction. In addition, the brush device 7 and the laser head 5 follow up so as to ensure that the direction and magnitude of the Lorentz force in the processing area of the laser head 5 remain stable.

The surface of components to be processed 1 to which the electromagnetic field device can be applied is not limited to a horizontal plane, but can be a curved surface, an angled working surface or a vertical working surface, or even an elevation angle working surface.

In the laser processing area, the stable electric field is coupled with the stable magnetic field to form a directional Lorentz force, which provides an additional force field for the laser processing area.

The content described in the embodiments of the present specification is only an enumeration of the realization forms of the inventive concept, and the protection scope of the present invention should not be regarded as limited to the specific forms stated in the embodiments, and the protection scope of the present invention also extends to equivalent technical means that can be conceived by those skilled in the art based on the inventive concept.

The invention claimed is:

1. An attachable electromagnetic field auxiliary device for large components, comprising:
   an iron core (3) that can be attached to a component to be processed (1) with an integral rectangular frame including a pair of lateral sides and a pair of longitudinal sides, each lateral side being installed with an electromagnetic coil (2), the two electromagnetic coils (2) being connected in series, the N pole of the magnetic field of one of the two electromagnetic coils (2) pointing to the component to be processed (1) and the S pole of the other of the two electromagnetic coils (2) pointing to the component to be processed (1);
   a laser head (5) configured to move in an inner space of the iron core (3);
   a photoelectric sensor (4) that is installed on the longitudinal sides of the iron core (3), the photoelectric sensor (4) sensing the real-time longitudinal position of the laser head (5), a data output end of the photoelectric sensor (4) being connected to a central controller, the photoelectric sensor (4) comprising a photoelectric transmitter (401) and a photoelectric receiver (402) respectively installed on a corresponding one of the pair of longitudinal sides;
   two screw movement devices (6), each screw movement device (6) being respectively provided at a corresponding one of the longitudinal sides of the iron core (3), the two screw movement devices (6) being symmetrically arranged, each screw movement device (6) comprising a motor (601), a base (602), a screw (603), and a slider (604), the screw (603) being connected to the iron core (3) through the base (602), the motor (601) driving the screw (603) to rotate to move the slider (604) along the corresponding longitudinal side of the iron core (3), an inner thread of the slider (604) being engaged with the screw (603), a control end of the motor (601) being connected to the central controller; and
   two brush devices (7), each brush device (7) being respectively provided at a corresponding one of the longitudinal sides of the iron core (3), each brush device (7) comprising a brush head (701) that slides on the surface of the component to be processed (1) to form a directional electric field, a brush clamp (702) that is connected with a corresponding one of the sliders (604), and an elastic copper sheet (703) that is installed on the brush clamp (702), an end of the brush head (701) furthest away from the component to be processed (1) contacting the elastic copper sheet (703), the elastic copper sheet (703) keeping the brush head (701) in contact with the component to be processed (1) during movement of the corresponding slider (604),
   at least one of the brush clamp (702) and the slider (604) being made of heat-resistant insulating material,
   the control end of the motor (601) being is-connected to the central controller to adjust the position of the brush devices (7) so that the two brush heads (701) and the laser head (5) are always kept in a straight line.

2. The attachable electromagnetic field auxiliary device for large components according to claim 1, wherein bottoms of the lateral sides of the iron core (3) are each provided with one of the electromagnetic coils (2), the bottoms of the electromagnetic coils (2) being in contact with the component to be processed (1).

3. The attachable electromagnetic field auxiliary device for large components according to claim 1, wherein each brush head (701) is an integral conductive block of which a surface contacting with the component to be processed (1) is in the shape of an arc.

4. The attachable electromagnetic field auxiliary device for large components according to claim 1, wherein each brush clamp (702) is provided with an counterbore that is connected to the corresponding slider (604) by screws.

5. The attachable electromagnetic field auxiliary device for large components according to claim 1, wherein the surface to be processed of the component to be processed (1) is a plane, a curved surface, an inclined surface, a vertical surface, or an elevated working surface.

* * * * *